United States Patent [19]

Reiniger

[11] 4,245,999

[45] Jan. 20, 1981

[54] METHOD AND APPARATUS FOR OBTAINING LOW ASH CONTENT REFUSE FUEL, PAPER AND PLASTIC PRODUCTS FROM MUNICIPAL SOLID WASTE AND SAID PRODUCTS

[75] Inventor: Haigh McD. Reiniger, Duxbury, Mass.

[73] Assignee: Kenneth S. Safe, Jr., Boston, Mass.

[21] Appl. No.: 936,652

[22] Filed: Aug. 25, 1978

[51] Int. Cl.$^3$ .......................... C10L 5/46; C10L 5/48; B02C 23/14

[52] U.S. Cl. ........................................ 44/1 D; 44/2; 241/19; 241/20; 241/24; 241/73; 241/188 R; 241/DIG. 38

[58] Field of Search ................. 44/1 D, 2, 13; 241/24, 241/25, 29, DIG. 38, 73, 74, 79.2, 86.1, 188 R, 19, 83, 85

[56] References Cited

U.S. PATENT DOCUMENTS

| | | | |
|---|---|---|---|
| 3,506,414 | 4/1970 | Skendrovic | 44/1 R |
| 3,910,775 | 10/1975 | Jackman | 44/13 |
| 4,026,678 | 5/1977 | Livingston | 44/1 D |
| 4,072,273 | 2/1978 | Reiniger | 241/24 |

Primary Examiner—Carl F. Dees
Attorney, Agent, or Firm—Edgar H. Kent

[57] ABSTRACT

A chopped mixture derived from municipal solid waste, free of ferrous metal is fed into the open upper end of a vertical rotor chamber for contact sequentially by an upper and lower high-speed rotor, with the rotor blades of the rotors further chopping the mixture and imparting centrifugal force to the mixture particles. Selectifier screens concentrically surround the rotor blades at the upper and lower rotor positions and have mesh openings which effect ballistic separation and elimination of glass, grit, sand, dust and fiber elements at these levels dependent upon the screen size openings. The two rotors are separated to form an intermediate treatment zone permitting liquid or solid spray of the mixture particles passing vertically downward from the upper rotor zone to the lower rotor zone. The lower end of the rotor chamber opens toward a horizontal high-velocity airflow which is accelerated by modified venturi action to suck oversize lightweight plastic film out of the rotor treating zones to effect isolation of lightweight materials from the rotor zones to insure substantially plastic-free, low ash content, solid waste refuse derived fuel, particularly as discharged from the lower rotor zone being sized uniformly through the lower selectifier screen. Other modifications of the process are described, as well as important alternate uses for this garbage sorting machine forming the subject of this disclosure.

21 Claims, 7 Drawing Figures

FIG 2

METHOD AND APPARATUS FOR OBTAINING LOW ASH CONTENT REFUSE FUEL, PAPER AND PLASTIC PRODUCTS FROM MUNICIPAL SOLID WASTE AND SAID PRODUCTS

BACKGROUND OF THE INVENTION

1. Field of the Invention

This invention relates to obtaining of a chopped, combustible mixture from municipal solid waste, and, more particularly, to a substantially plastic-free, low ash content and low sulfur content fuel, and the apparatus and process of obtaining that fuel product.

2. Description of the Prior Art

Attempts have been made to treat municipal solid waste garbage, particularly to separate or classify the material content, chop the content of the solid waste into relatively small particle size, classify and separate the material content into ferrous metal, non-ferrous metal, glass, grit, sand, textile, plastic and paper components. It has been found that municipal solid waste contains a high content of combustible material permitting the municipal solid waste to function as a fuel having a relatively high BTU content, particularly where that fuel is added as a secondary fuel to a primary fuel, such as a hydrocarbon fuel, for fueling commercial boilers, electrical generating plants, commercial and industrial heating plants and the like.

In the treatment of municipal solid wastes, various types of mechanical machines are employed to break the bulky municipal solid waste trash into smaller sizes and to attempt separations of the material content, particularly to remove large quantities of particles, such as glass and dirt as well as to separate the components of such municipal solid waste such that the components may be re-employed as pulp in the manufacture of various products. Thus, it is possible to recycle much of the material appearing in municipal solid waste refuse. A process and apparatus for the dry recovery and restoration of confetti thrashed paper, construction aggregates, fibrous fuel and other materials from solid municipal refuse forms a subject matter of my earlier U.S. Pat. No. 4,072,273.

In that patent application, municipal solid waste in an automatic apparatus is chopped, sorted, air cleaned, subjected to specific gravity and ballistic separation while separating and rejecting loose, soft, decayed, wet and extraneous matter, including high-density particles and abrasive material such as non-ferrous metal, grit and glass. One part of that apparatus which is highly useful in further chopping and ballistic separation of the particle content of the municipal solid waste comprises a vertically-oriented cylindrical rotor chamber. An opening in the upper end receives previously chopped, ferrous metal-free, municipal solid waste mixture in a vertically-oriented single rotor mounted for rotation about its axis within the chamber, and a plurality of radially extending hammer blades chop the mixture and impart centrifugal force to the mixture particles for ballistic separation by forcing the particles of given size to pass through a cylindrical classifier screen concentrically surrounding the rotor blades and positioned within the rotor chamber and being spaced slightly from the tips of the blades to permit the radial passage of the particles corresponding to the screen mesh size. Those chopped mixture particles which, because of weight and/or size, do not pass through the classifier screen fall by gravity from the bottom of the rotor chamber. Normally, the specific gravity and ballistic separation achieves a contaminated confetti thrashed paper at the bottom end of the rotor chamber, and the extraneous matter such as high-density metal particles and abrasive materials are separated horizontally by passage through the classifier screen. While this type of ballistic separation provides satisfactory operation in terms of further chopping and thrashing the refuse particles, it has not performed adequately to insure separations of any desired degree for oversized contaminants from the usable particle material.

Particularly, this type of machine, although capable of providing, by way of specific gravity and centrifugal force, classification and separation of some contaminant particles from the confetti thrashed paper has been incapable of achieving separation of the chopped plastic film and other lightweight plastic particles from the confetti thrashed paper and the contaminants. This has resulted in classified products which cannot normally be employed as an adequate source of fuel since, on the one hand, the products include excessive amounts of high-density particles, such as pulverized glass, ceramics, grit, hard plastic and non-ferrous metal, whereby the ash content after combustion is well above accepted limits while, on the other hand, the presence of heavy plastic bags, particularly plastic film and bottles do not provide a thoroughly chopped fuel product.

Further, because of the plastics and diverse contamination of the prior art confetti, subsequent to the specific gravity and ballistic classifying, it was necessary to subject the confetti thrashed paper of my prior application to subsequent steam digester treatments to affect digestion of that mixture into fiber pulp, at which time the resulting pulp was later air classified, permitting the then plastic-free fiber to be subsequently used for recycled paper pulp or as a fuel product.

It is therefore a primary object of the present invention to provide an improved apparatus for use in the treating of raw materials of diverse nature and from various sources, including organics and inorganics, specifically for city garbage, yard trash and refuse having no commercial value, in which portions of the materials are fragmentized, selected in accordance with material content and size, resulting in select products of low resultant ash content and of low plastic film content, for example, as a uniform refuse fuel product for generaing industrial heat and electric power.

It is a further object of the present invention to provide within a single apparaus processes which effectively treat the raw feed materials within four zones, including two axially spaced screen selectifier zones, an intermediate solution treating zone and a final high-velocity aspiration zone, and to aspirate lightweight plastic films, textiles and the like out of the screen selectifier zone and facilitate utilization of recovery materials upstream of the aspiration zone.

It is a further object of the present invention to provide an apparatus employing independent rotors cooperating with cylindrical screens at spaced vertical positions within a vertical chamber while effecting directed airflows at relatively high velocities and within a venturi which opens to the rotor zone to facilitate discharge operations including separations of lightweight plastics for full recovery purposes.

It is a further object of the present invention to provide an improved process for treating municipal solid waste garbage to render said refuse into an essentially low ash content chopped mixed fuel product resulting therefrom, with the fuel product ash content consistently below 3% and having a heating value of approximately 7,300 BTU per pound.

It is a further object of this invention to provide an improved apparatus in the form of a high-speed rotor carrying radial rotor blades and rotating within concentric selectifier screens, and wherein the unique rotor includes air passages between the rotor blades to create directed airflow from the center of the rotors outwardly through the screen to assist in clearing the screen plates from dust and airborne particles through the introduction of pulsating airflows on the screen.

SUMMARY OF THE INVENTION

The present invention provides an improvement in an apparatus which is particularly applicable to the treatment of municipal solid waste and which is capable of producing a substantially plastic-free product from a chopped mixture derived from said municipal solid waste, although the apparatus has equal application to many diverse raw materials. In such apparatus, which comprises a cylindrical wall defining a vertically-oriented rotor chamber and having a shaft extending vertically within the chamber and mounted for rotation about its axis, with means for rotating said shaft and rotor blades mounted to the shaft for further chopping the mixture and imparting abrasion forces to the mixture of particles entering the chamber from the open upper feed end of the cylindrical wall, and wherein with open bottom, classifier screens are concentrically mounted so as to surround the fan rotors and blades, being positioned within the vertical chamber and forming annular collection chambers within the rotor zones. The selectifier screens are spaced radially slightly from the tips of the blades to permit radial passage of particles of materials corresponding to screen mesh size through the screen. A full diameter inlet is provided at the top of the first rotor chamber for accepting the in-feed. A first output is provided at the bottom of the chamber within the screens. A second outlet is provided between the screens and the inner periphery of the rotor chamber wall and opening to a collection chamber formed thereby. Improvements reside in means for directing high-velocity horizontal airflows across the open lower end of the screen from one side of the chamber to the other to cause lightweight particles of the feed, including plastic film, within the interior of the screen to exit rapidly through the first outlet and prevent clogging or blinding of the screens within the rotor chambers.

Preferably, the means defining the high-velocity airflow beneath the open lower end of the screen includes modified venturi means to induce a negative air or vacuum within the rotor zone to facilitate removal of the lightest weight material particles from the rotor chamber. Upper and lower vertically-displaced rotors may be mounted within the rotor chamber, with each rotor concentrically surrounded by a separate cylindrical screen and with horizontal baffle means vertically separating the annular collecting chamber into sections, thus permitting independent separations and discharge of particles of the chopped mixture of different particle size and/or content.

Further, the upper and lower rotors may be vertically spaced to define an intermediate fluid treatment zone between the first and second rotor, and shower spray means may be provided within the treatment zone for spraying liquids or the like onto the particles of the feed during movement vertically from the first rotor zone into the second rotor zone defined by said upper and lower rotors such that the specific gravity, for example, of the particles passing from the upper portion of the rotor chamber to the lower portion may be increased in terms of their weight to further facilitate reduction of the chopped mixture and attrition of said particles at the level of the lower rotor. However, such treatments in the intermediate zone may be for many diverse purposes.

The apparatus of the present invention is utilized in a process for producing substantially plastic-free, low ash content, high BTU fuel products from municipal solid waste in a process in which municipal solid waste refuse as received is subjected to steps of primary shredding, magnetic separation to magnetically separate the ferrous metal content from the remaining content and heavy object removal. The improvement in the process comprises the further steps of subjecting the lightweight fraction from the heavy object removal to a rotating ballistic treatment within a cylindrical screen which surrounds the rotor fan blades and which is of a mesh to permit passage of fines radially outwardly of the selectifier screen while simultaneously aspirating, by the flow of high-velocity air beneath the cylindrical screen and from one side to the other and generally at right angles to the axis of rotation of the rotor, the lightweight plastic film, textiles, foam, etc. into the high-velocity airflow to cause such film, etc. to separate from the fines, resulting in a processed fuel product discharging from the level of the rotor pre-sized for immediate commercial use.

The lightweight fraction from the heavy object removal may be subjected to sequential, tandem fragmentation and classification to produce initially at the higher vertical level a fine dust, including glass, dirt, stone and hard plastics, and at the lower rotor level a substantially oversize-free, low ash content chopped fuel product, while the oversized particles are removed by high-velocity airflow aspiration axially of and at the bottom of the garbage sorter.

Selectively, chopped mixed fuel products of different BTU content, ash content, plastic, textile and organic content may be achieved through coordinated adjustments in the machine operation.

A single shaft, vertical, unobstructed top feeding shredding machine is thus designed for rugged, heavy duty sorting and reduction of raw materials, their treatment and separations by particle sizes, undersize and oversize, through selectifier screen(s) as perforated fixed cylinders. The screen(s), vertically aligned, are spaced but interconnected for complementary combinations of treatments both through screen separations and at the interfaces through two spaced and separate sets of rotors, fans and blades. Thus, takes place the development of interfacial treatments through combined air transfer of particles and centrifugal impacting through the separated cylinder screens at speeds of 6,000–12,000 ft/m generated at the interface of the surfaces of blades and screens. Thus, my sorting machine provides a three-way triple discharge of in-feed materials having uninterrupted transition feeding from start to finish with wide variations in the actual selectivity, as to the intensity, particle size, acceptability, recovery and oversize elements/fractions.

My new garbage sorter is distinctive in the isolation and direct recovery of energy fuel from municipal city garbage, yard trash, household wastes and refuse through removal of heavy infestations of dirt, glass, etc. Non-burnables up to 25%, by weight, or more have been consistently reduced to ash levels of 2–3%, by weight, thus yielding an attractive fuel source from solid waste at 7,300–7,800 BTU/lb. The recovery of included film plastics, textiles, papers, etc. is entirely feasible as my garbage sorting machine has been shown to be suitable for separate applications for treatment and recovery of vegetable fibers, agricultural products, chemicals, ores, coal, organics and inorganics. Two specific applications for such sorting techniques are noteworthy as for the crushed fiber of sugar can bagasse, wood chips for fiber boards, particle boards and wood pulps, wherein distinct classes of particle sizes are useful in the ongoing manufacture of such products, and where sophisticated sorting and processing treatments are found in the preparation of dry chemicals, synthetics, organics, ores and minerals. Surface treatments are noteworthy for the abrasion reduction of surfaces without destruction of the underlayers or structural portions of many materials including the treatment of surfaces through controlled consecutive abrasions where a direct cleaning of substances is essential rather than classification or sorting of feed stocks.

DESCRIPTION OF THE PREFERRED EMBODIMENT

The process of the present invention has particular application to the manufacture of a substantially plastic-free, low ash content chopped mixed fuel product as from municipal solid wastes, trash and refuse, and the process is illustrated in conjunction with a lightweight fraction fragmentizer and garbage sorter 5 which apparatus constitutes an important aspect of the present invention and which is illustrated in FIGS. 2–7, inclusive. Municipal solid waste, of course, may vary in content from geographical area-to-geographical area and from day-to-day. However, it has been ascertained that on the average, the material content of such municipal solid waste is approximately 60% paper, 3.5% plastic, 22% mixed garbage, 7.3% ceramics and 7.2% metals.

In conjunction with the present invention, in order to prepare such municipal solid waste, particularly to obtain an acceptable chopped mixed fuel, the municipal solid waste as received by a receiver such as receiver 1 is directed to a primary shredder which breaks up the large bulk into smaller size. Such large metal objects as may be received at the receiver may be hand-removed prior to subjecting the material to the operation of the primary shredder 2. Further, conventionally, after primary shredding, the shredded material is subjected to magnetic separation by magnetic separator 3 to remove the ferrous metals as shown, while subsequently, the shredded or chopped material is subjected to heavy object dropout as at 4 where the heavy objects are removed by rotary screens or traps and where the lightweight fraction from that heavy object dropout is available to the lightweight fraction fragmentizer and garbage sorter, constituting component 5 and to which the present invention is particularly directed. The material passing to unit 5 after treatment by conventional means 2, 3 and 4 will have, on the average and in terms of a 450 ton load, 79 tons of paper and textile, 14 tons of plastic, 95 tons of garbage, 57 tons of ceramics, 28 tons of non-ferrous metal and 26 tons of water. It is to this type of chopped municipal solid waste refuse of non-commercial value that the present invention is directed, particularly to achieve, by means of the apparatus designated generally at 5, FIG. 1, and by operation on material of the content above, the obtaining in a highly selective manner of a chopped fuel product particularly useful as a high BTU, low ash content fuel ready for commercial and industrial heating.

Figure 2:
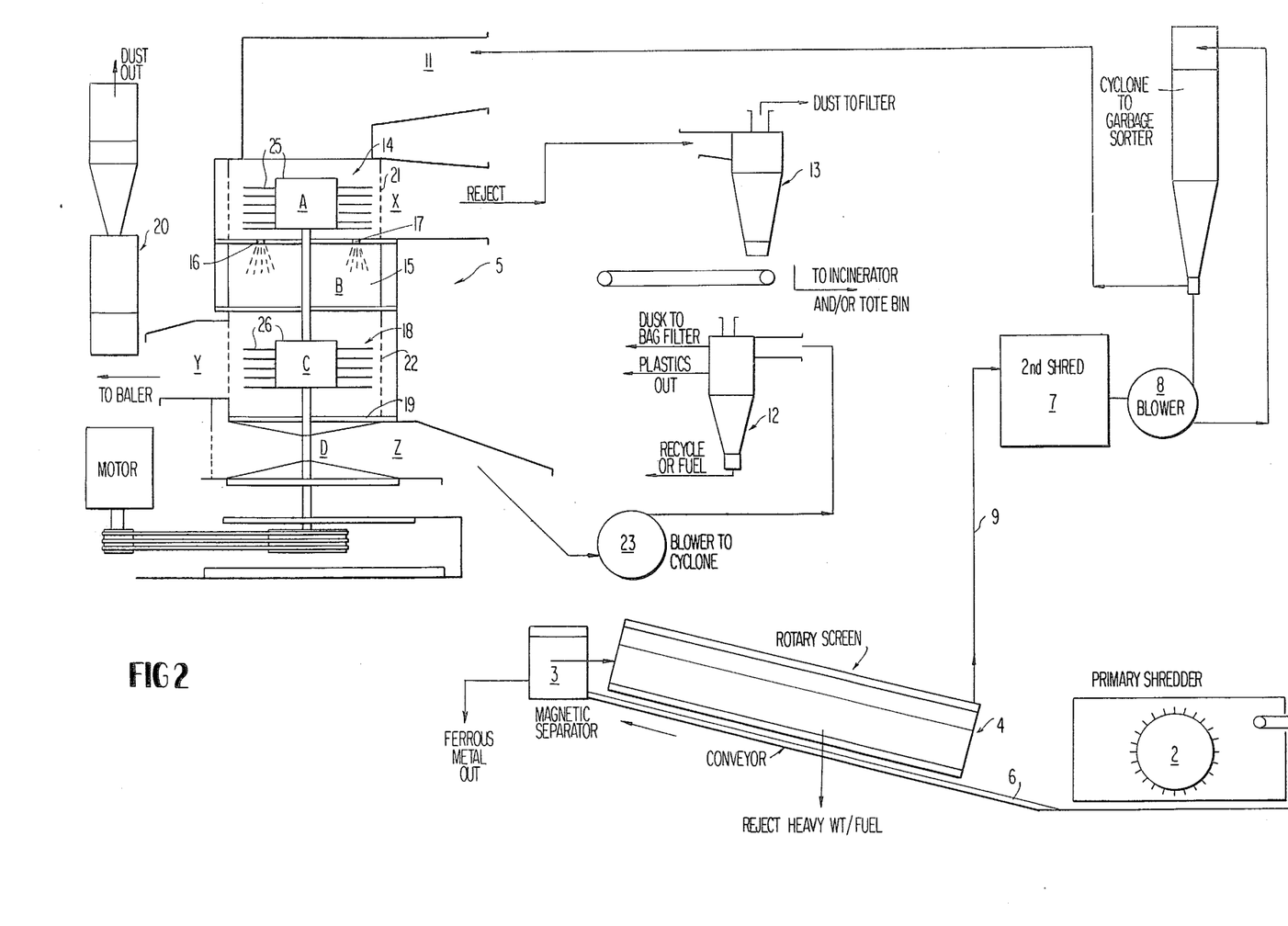
FIG. 2 is a schematic side elevational view of the apparatus employed in the process of FIG. 1.
Figure 3:
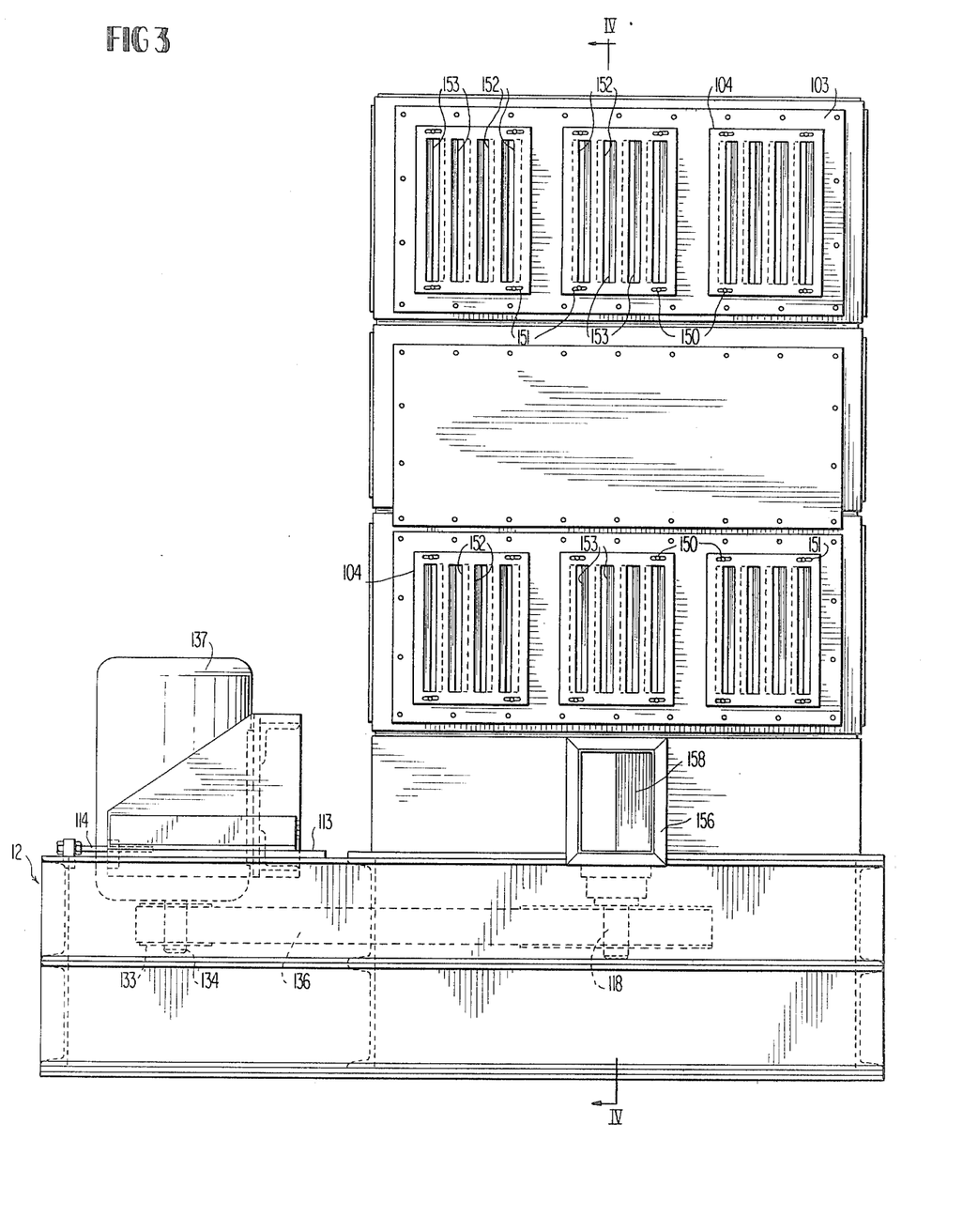
FIG. 3 is an enlarged, side elevational view of the lightweight fraction fragmentizer and classifier of FIG. 2 forming a principal aspect of the present invention.
Figure 4:
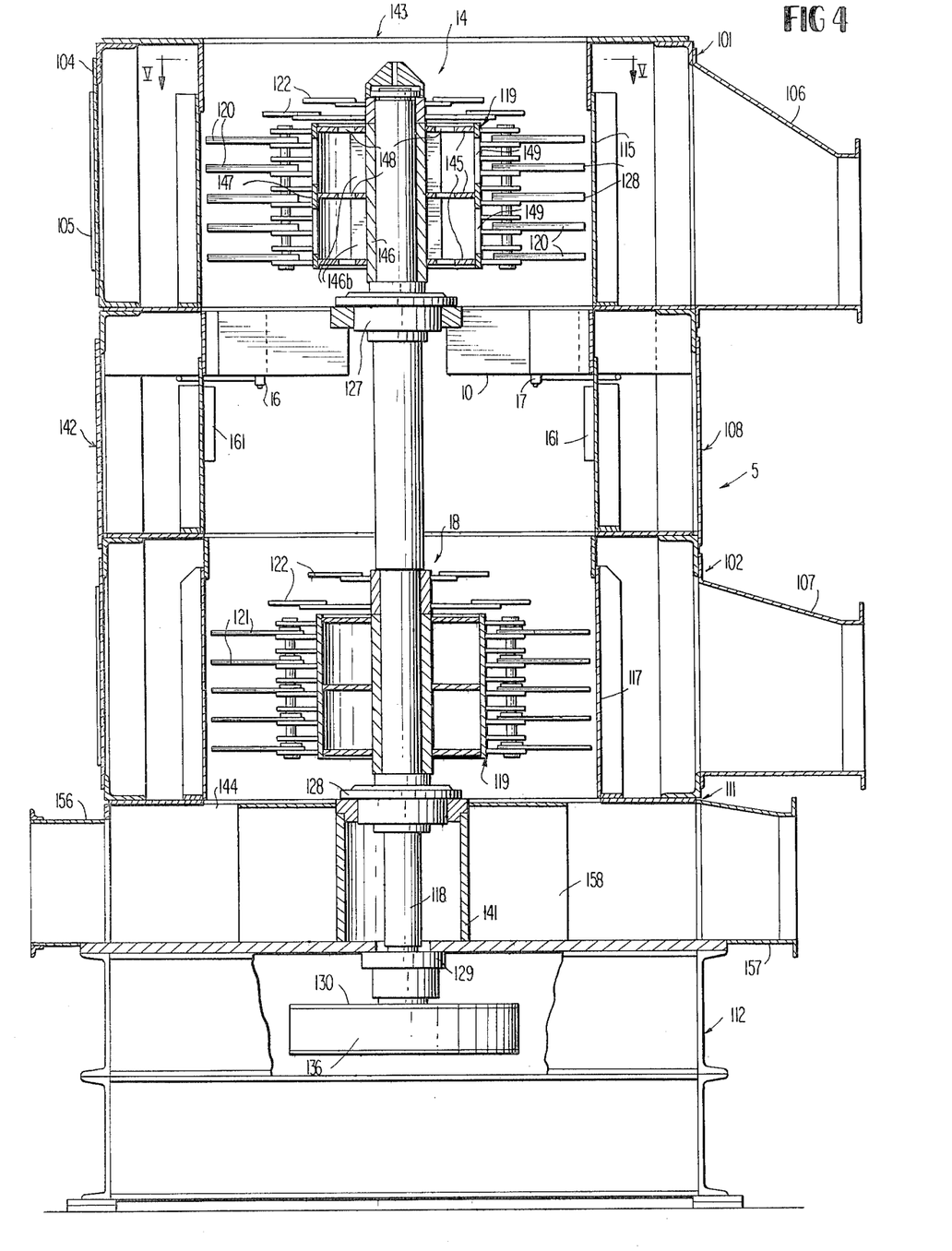
FIG. 4 is a vertical sectional view of the element of FIG. 3 taken about line IV—IV.
Figures 5, 6:
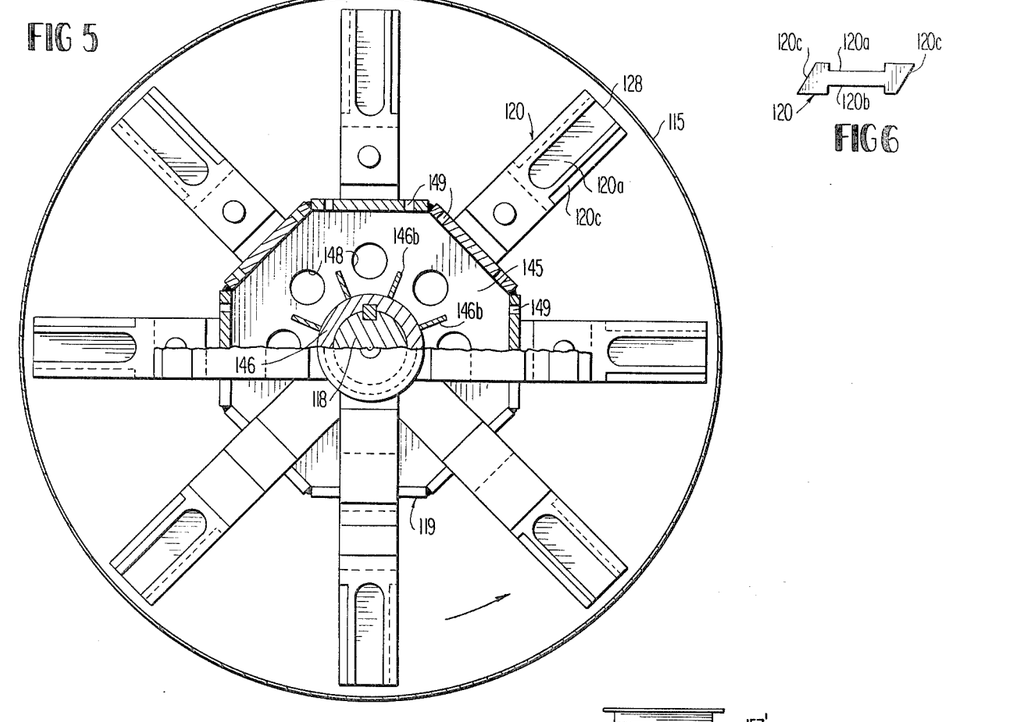
FIG. 5 is a horizontal sectional view of the apparatus of FIG. 4 taken about line V—V.
FIG. 6 is an end view of one of the blades of the apparatus of FIG. 5.
Figure 7:
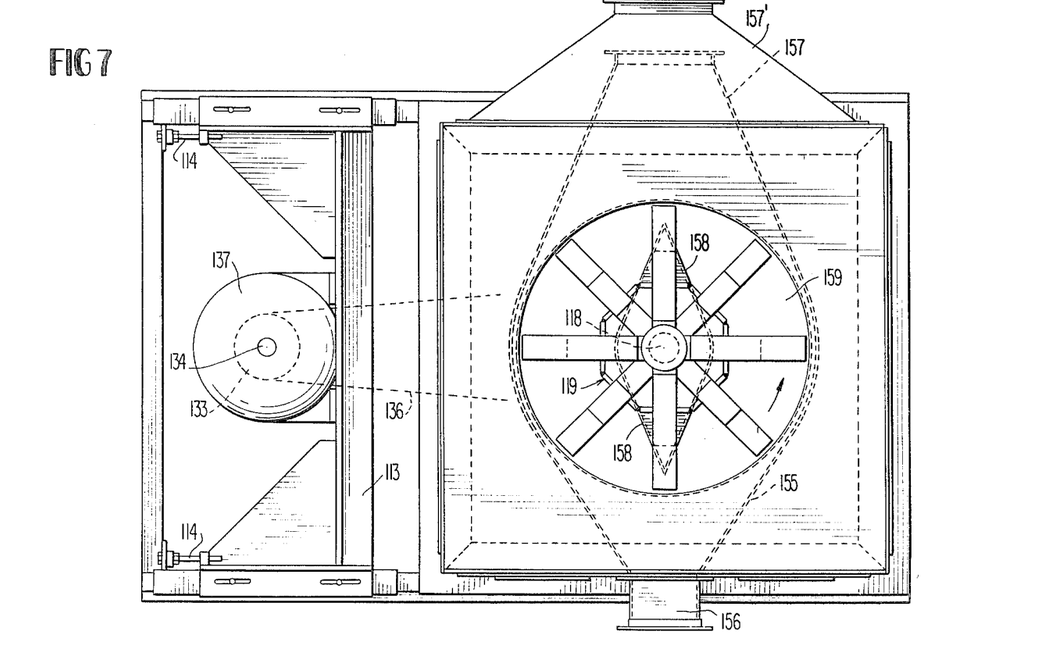
FIG. 7 is a top plan view of the apparatus of FIG. 3.

Turning next to the schematic view of FIG. 2 which constitutes the system component employed in effecting the process of the present invention to produce the improved fuel product and comprises primarily the lightweight fraction fragmentizer and garbage sorter 5. It may be appreciated that in comparison with the apparatus employed in my earlier patent as noted above, the illustrated apparatus of FIG. 2 employs an improved integrated fragmentizer and garbage sorter for treating raw materials and effecting their reduction in particle size as at 5. With respect to my prior application, while that apparatus ballistically treated raw materials, the raw materials contained excessive quantities of contamination from glass, grit, plastic, dirt, dust and the like which was not stripped by passage through the ballistic treatment area.

Further, conventional hammer elements operating in cooperation with grates or independent air sources of other prior apparatus, such as in other known classifier machinery, such as decorticators, depithers and the like, fail to eliminate or classify by classification and separation such high fines and high-density particles, particularly where the crushed glass and combined contaminants reach 25% or more of solid wastes subjected to such treatment, with some of the contaminants embedded into the surfaces, and such refuse products have been found to resist cleaning by other methods of screening, milling, shredding, blowing, filtering, etc.

Municipal solid waste, trash and city garbage is delivered to the system at receiving station 1 which may take the form of a conveyor belt or the like for moving the bulky waste from household, yard trash and commercial sources into a conventional heavy-duty crusher or primary shredder 2, FIG. 2. Such crushers may be of the Hazemag variety or of the hammer-type manufactured by the Williams Corporation. Any suitable crusher may constitute the primary shredder 2 whose function is to reduce the bulk of the municipal solid waste into a feedable state. Such crushed material at that point may be immediately transferred to magnetic separator 3 by way of a conveyor belt 6 or the like for removal of all ferrous metal. Conventionally, the magnetic separator may comprise a rotary magnetic roll (not shown) to achieve this end. Preferably, a rotary screening operation is used to remove loose, heavyweight stones, etc. from the mass of shredded material. In FIG. 2, the non-magnetic material discharging from the magnetic separator 3 is passed directly to the heavy object dropout device 4 where the lightweight fraction is directed preferably directly to the fragmentizer and garbage sorter 5. In this respect, a material handling fan 7 driven by electric motor 8 may direct the lightweight fraction by conventional air feed means, including a supply line 9 to the top of the vertically-oriented fragmentizer and garbage sorter 5. An optional secondary shredding is desirable but not essential. The stages provided by system components 2, 3 and 4 are essential to the reduction of ash in municipal solid wastes to be used for fuels.

The lightweight fraction from the heavy object dropout 4, whether secondarily shredded or not, is fed to the in-feed of the large diameter (48") tandem fragmentizer and garbage sorter 5 by the materials handling air blower fan 7, preferably followed by a cyclone feed as at 11. As may be appreciated, following passage through the fragmentizer and classifier 5, the fuel products will be discharged and transferred immediately into a furnace or baling station, compactor, pelletizer, bricketeer, pulverizer or other similar apparatus to effect any desired form of the finished fuel product. Cyclone or wet discharge for the fines is provided. The plastic fraction cyclone 12 insures the discharge of the oversized plastic fraction will be sufficiently effective to pull the plastic through the aspirator where it may be collected and reused in the plastic recovery operation. Such plastics will normally be partly contaminated. However, through subsequent solvent recovery systems or molding methods, plastics become ultimately valuable for reuse.

Further, the system employs a glass cyclone 13 or alternate wet discharge for collecting the fine rejects from the first-stage screen at the upper or top rotor zone, the first-stage rotor being indicated generally at 14, and a discharge from the glass cyclone 13 is directed, preferably immediately, to a filter station, as shown by the arrow, to prevent any glass or glass fragments from entering the atmosphere. Insofar as unit 5 is concerned, from top to bottom, this unit comprises the material handling cyclone 11, upper rotor 14, an intermediate spray treatment zone 15 including water spray means or nozzle 16 and detergent spray means or nozzle 17, and a lower bottom or second-stage rotor 18 and an aspirator 19. The rotors 14 and 18 define fragmentization and ballistic recovery zones. An aspirator 19 underlies the lower rotor 18 with its discharge feeding directly to the plastics cyclone 12. The lower rotor 18 feeds directly to a fuel product cyclone 20, permitting the direct recovery of the low ash content chopped mixed fuel product, being substantially plastic-free and having minimal contamination, permitting the immediate use of such fuel products in existing industrial and commercial energy and heating systems.

Figure 1:
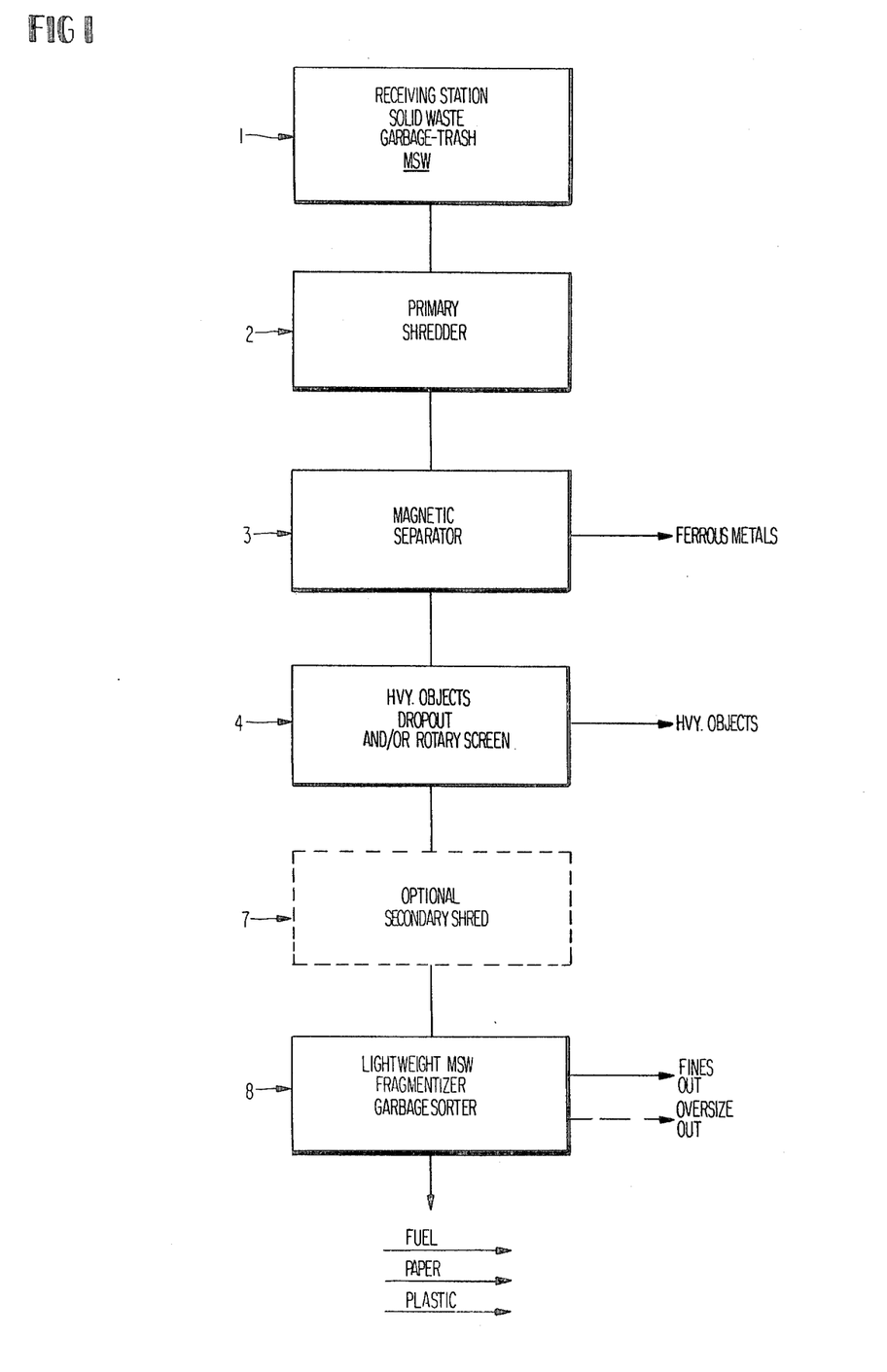
FIG. 1 is a block diagram of the process steps of the improved process for the formation of substantially plastic-free, low ash content chopped paper fuel product from municipal solid waste of the present invention.

As may be appreciated, the dual rotor fragmentizer and sorter 5 is an essential element of the system of FIGS. 1 and 2 and constitutes a principal aspect of the present invention. Rotors 14 and 18 operate in cooperation with cylindrical classifier screens and provide a unique triple discharge arrangement for unit 5 which automatically provides for the upgrading of materials to eliminate contaminants, cause controlled size by abrasion shredding, fragmentizing and disintegrating and the like of particles under treatment, while permitting separations and provision for special additives between the rotor zones so that, in effect, there are four zones within unit 5. The first zone A, FIG. 2, constitutes an in-feed and first rotor stage at the top of the apparatus, followed by a treating zone B below the first-stage rotor 14. The treating zone may be employed for the introduction of chemicals in solution through showers and sprays for the purposes of moisture control, dust control and, as with wetting agents, for the purposes of precise reduction of materials to permit specific gravity and centrifugal forces to operate effectively in the rotor area and in conjunction with the cooperating classifier screens 21 and 22 for rotors 14 and 18, respectively. Following the treating zone B, there is provided a secondary or lower rotor stage comprising rotor 18 and screen 22 to permit the separation of materials for suitable industrial processing at later stages. The fourth zone is the aspirating zone D which lies beneath the secondary rotor stage zone C. A venturi 19 within the aspirating zone D provides a transverse air path by operation of suitable blower 23, FIG. 2, causing acceleration of high-velocity airflow below the secondary rotor, the zones A, B, C and D being open vertically such that the lower pressure created by the high-velocity air upon operation of blower 23 improves the discharge of waste material particles within the screens 21 and 22, and, particularly, screen 22 prevents the blinding of the screens 21 and 22 while assisting in the actual separation of materials by weight since the lightweight plastics and other lightweight materials, such as dust and films, are drawn into the venturi 19 and discharged rapidly by operation of blower 23 to the plastics cyclone 12. Such lightweight plastics contaminate valuable raw material commodities frequently found in secondary waste sources, and such foam and film plastics are extremely difficult to remove. The negative air pressure or vacuum air zone at the lower rotor establishes aspiration discharge of the lightweight components within screen 22, assists in clearing the rotor zones A and C and aids the prevention of blinding of screen areas by sucking such plastic film and foam particles out of the treating area. The aspirator combined with air vents is effective in causing a classification and separation of oversize plastics and textiles lightweight materials from both the primary and secondary rotor zones A and C.

In the illustrated system of FIG. 2, the first rotor 14 effects a discharge at X which is a fine fraction ballistically and air separated after fragmentizing and contains glass, grit, sand, dust or fine particles which pass a screen size of given mesh. For instance, such screen may have ¼ inch openings. The second discharge is effected at rotor 18 in zone C, the second discharge at Y being through a second cylindrical classifier screen 22 which may have larger holes, such as ⅝ inch or ¾ inch or up to 2 inches, to provide a desired, specific product size as a specific fraction of the original in-feed. Lastly, in the aspirator zone D, there is effected a third discharge Z constituting the oversize from the secondary lower rotor which also, due to the relatively high-speed airflow, particularly through the venturi 19, and acting principally on the lower rotor zone C, will pull and eject the oversized fraction from the system under operation of blower 23 along with the very lightweight oversize particles of plastic film or other lightweight objects which tend to be retained within the rotor zones A and C and which tend to block flows through the classifier screens operating on materials under the applied centrifugal forces and directed air from the rotors. With the blower 23 operating, the reduced pressure caused by the high velocity of air tends to prevent the rotors 14 and 18 from inducing airflow upwardly and reduces any back pressure at the in-feed from the aspirator zone D through rotor zones A and B implementing radial discharge. The blades 25 of rotor 14 and blades 26 of rotor 18 tend to pull the air into the rotor zones A and C and discharge that air radially at discharge points X and Y, respectively.

Referring to FIGS. 3, 4, 5 and 6, the fragmentizer and classifier 5 includes a suitable base 112 in the form of an open framework of beams or the like and has legs which terminate at their bottoms in vibration mounts to isolate the apparatus 5. Fixed to the base 112 is lower casing 111 of rectangular configuration and upon which is directly mounted rotor stage 2 casing 102. In turn, the stage 2 casing supports middle casing 108 and which, in turn, supports rotor stage 1 casing 101. All casings are generally of the same size and configuration. Appropriate flange connections are made between the various casing to form a vertically stacked assembly. The base 112, in addition to supporting directly the lower casing 111, also supports to one side the motor 137, the motor being mounted by way of motor base 113 and motor adjusting screw 114 in a manner such that the motor can be shifted horizontally to move its vertical axis toward and away from the shaft 118 which bears the upper rotor indicated generally at 14 and the lower rotor indicated generally at 18. The motor 137 is provided with a motor sheave 133 fixed to the shaft 134 of that motor. Further, the shaft 118 is mounted by way of a lower flange block 129 fixed to the lower casing 111, a middle flange block 128 also mounted to the lower casing through a cylinder 141 which concentrically surrounds shaft 118 at this point, and an upper flange block 127 which is fixedly mounted by way of an upper bearing support spider 10 within middle casing 118. Fixed to the lower end of the shaft 118 and protruding below lower casing 111 is a rotor sheave 130. The sheaves 133 and 130 bear a V-belt to effect rotation of the shaft 118 upon energization of the motor 137. As mentioned previously, all of the casings are essentially rectangular in horizontal cross-section, although they could be circular, and are stacked one on each other and integrally joined by way of flange connections such that casings 111, 102, 108 and 101 define a hollow tubular enclosure or wall indicated generally at 142, with the enclosure including an open upper end as at 143 defined by a top wall of the first-stage casing 101 and being open at 144 at the bottom of the stage 2 casing 102 and leading directly in the lower casing 111. The first-stage or upper rotor 14 comprises a hollow cylindrical first-stage rotor hub 119, including three, axially-spaced annular rings 145 fixed at their inner end to a sleeve 146 which is mounted to and rotates with the shaft 118 and bearing a cylinder 147 fixed to their outer peripheries. The annular rings 145 are provided with slots as at 148, permitting air to be drawn axially into the interior of the hollow rotor hub 119, while the cylinder 147 is provided with a plurality of circumferentially-spaced vertical slots 149. A plurality of vertical circumferentially spaced fan blades 146b are fixed to sleeve 146 to induce axial airflow into the hub and radially outwardly thereof. Mounted to the periphery of the cylinder 147 is a plurality of first-stage rotor blades 120, the blades may be a foot or more in length, may be of variable thickness, for instance, one inch or so, and be of variable width. The number of blades may vary. However, it is important that the tips of the blades as at 128 be positioned in close proximity to the first-stage classifier screen 115. Preferably, the blades 120 are in strip form, of rectangular cross-section and include upper and lower face slots 120a and 120b, respectively, for some distance radially inwardly of the blade tips, also the leading edges are beveled downwardly at 30°-45° as at 120c, in the direction of blade rotation. The edges are reversely beveled, with the blades being capable of upside or downside mounting. Further, vertical breaker bars may be optionally provided at circumferentially-spaced positions on the inside surface of the screen 115 to facilitate attrition in response to the movement of the particles by high-velocity airflow radially as a result of rotation of shaft 118. Further, the rotation of the shaft and thus the rotor 14 as well as rotor 18 creates airflow axially into the interior of the hollow rotor hub 119 through the slots 148 and thence radially outwardly through slots 149 of the cylinder 147 and between the blades to effectively cause an intermittent or pulsating airflow to strike the screen, causing the materials flowing through the screens to be agitated to effectively clear the screen, but especially helpful in eliminating dust and floating matter which significantly contaminates the materials in process and for recovery reuse.

In addition, the sleeve 146 bears shorter length blades constituting feed blades as at 122 which rotate with the shaft above the hollow rotor hub 119. Like elements are provided for rotor 18 and given like numerical designations. With respect to the stage 2 casing 102 and rotor 18, a second classifier screen 117 is employed, which preferably is of different mesh size depending upon the nature of the raw material being processed and the product desired. As stated previously, the classifier screen 115 may be of approximately ¼ inch mesh, while that of screen 117 may be ⅝ inch or ¾ inch mesh or larger. With respect to the casings which surround each rotor stage, the casing 101 being rectangular in form, provides at one side opposite stage 1 reject transition 106 adjustable air vanes, as does casing 102 to the side opposite stage 2 accept transition 107. In this respect, the stage 1 casing 106 is provided with an air inlet plate 103 upon which mount, by means of pins 150 and air inlet cover 104 bearing parallel vertical slots or openings 152. Narrow horizontal slots 151 within cover 104 have pins 150 projecting therein such that the air cover 104 may be shifted laterally to cause the slots 152 within the air inlet plate 102 to be aligned, or misaligned, with respect to corresponding slots 153 of the air inlet cover 104. In similar fashion, adjustable air vanes are provided for the stage 2 casing on the same side, and like elements are given like numerical designations. The internal fan vanes within the rotor housing accelerate fresh air and provide a transfer of material totally away from the rotor at zones A and C (optionally).

In conjunction with the aspirating zone D suitable vertical ducting 155 defines an air inlet 156 and an air outlet 157 on opposite sides of the lower casing 111 of the apparatus, the ducting 155 flaring outwardly from the inlet side towards shaft 118 and then flaring inwardly towards outlet 157 in a direction away from the shaft. Further, an appropriate vertical shroud 158 surrounds cylinder 141 and shaft 118, and is configured so as to form reduced cross-sectional areas within the divided flow path as at 159 from the inlet 156 towards the outlet 157, the shroud 158 and the ducting 155 thereby defining a venturi for each of the divided airflow path aligned with shaft 118, which flow path opens by way of opening 144 to the zones A, B and C of the unit. It may be particularly appreciated that the dual venturies are aligned with tips of the rotor blades 120 and 121 of respective rotors 14 and 18, thereby facilitating the aspiration of lightweight plastic film and other floating particles which exist between the blade tips and the screens into the forced air venturi flow path. The air outlet as at 157 may be flange connected appropriately to a blower such as blower 23, FIG. 2, which blower, when motor driven, creates high-velocity suction flow to the ducting 155, and thus, the desired aspirating effect insofar as zones A and C are concerned for respective rotors 14 and 18. The middle casing 142 may be provided with a cylindrical wall 161 constituting an extension joining the screens 115 and 117, these walls being imperforate but forming a common cylindrical flow path for the municipal solid waste or other raw material in chopped form as it moves vertically downward from the direction of the arrow stock in-feed towards the aspirating zone D. In line with FIG. 2, the wall 161 bears on opposite sides water spray nozzle 16 and detergent spray nozzle 17. The means for delivering the liquid vapor or powder, as the case may be, to the spray nozzles 16 and 17 are purposely not shown; they may constitute any conventional means. In operation, the motor 137 may drive the rotors which, depending upon their speed of rotation and the effective diameter of the rotors as defined by blades 120 and 121, usually operated at 8,000–12,000 1/minute tip speeds, cause, for example, 2,000–3,000 cfm of air to be applied to the lower rotor zone C in a unit in which the rotor is nominally 18 inches in diameter. Blowers of 6,000–10,000 cfm may be employed to achieve higher flow rates and to effect removal of materials of heavier weight.

It is also obvious that by use of the tandem rotor, mechanical fragmentization is effected in two zones, and proper classification is achieved to eliminate undesirable contaminants and to bring the ash content of fuel-bearing fractions from solid waste to a level of 2–4% while, at the same time, the fuel value may be on the order of 7,300 BTU per pound for the low contaminant solid waste material particles of high fiber content. Further, the material discharging through the stage 2 accepts transition 107, and to the cyclone 120 constitutes especially high-grade fuel which is substantially free of plastic film, light metals, glass or other contaminants usually found in waste materials. The bulk of such plastic film, foam, textiles or particles of lightweight metals are effectively collected by way of the aspirator from the lower rotor stage as oversized products and eliminating this source of chemical pollution of the fuel products. Consequently, there is achieved a means for utilizing that quantity of municipal solid waste normally landfilled or incinerated at high cost in the production of a special environmental grade energy fuel of low pollution and low ash content. The fragmentizer and classifier 5 of the present invention minimizes particulates as well as chemical pollution to meet the highest EPA standards and falls easily within the framework of EPA requirements to date for fuel for use in urban areas. The fuel, in terms of product discharge stage 2 accept termination transistion 107, may be subsequently pulverized, formed into briquettes or otherwise transferred directly to an existing furnace system and may be combined or blended with existing fuels. A high BTU fuel is possible through the collection of the plastic fractions at the outlet 157 of duct 155. However, such plastics may prove to be more valuable for reuse through conventional recovery methods, chopped and-/or reformed or molded through thermal and combined compression methods to yield useful plastic products again. The process and apparatus of the present invention is particularly applicable for such classification purposes where plastics constitute a significant fraction of the in-feed volume. Thus, the apparatus of the present invention and its process are capable of separating plastics from other fractions, wherein the chopped fractions pass through the screen plates and the oversized plastic follows into the airstream at the aspirator where it is rapidly discharged. By controlling the mesh size of the secondary classifier screen 117 and by utilizatin of a secondary rotor of enlarged diameter with respect to the first rotor or driven at a higher speed, it is possible to cause the passage of larger certain plastic elements to the stage 2 accept transition 107. As such, that fuel product then contains mixed papers, textiles, wood particles and plastics if the source is municipal solid waste refuse or any variable or commercial mixed waste having a variety of constituents as described.

The improved fragmentizer and garbage sorter involving this tandem operation has additional applications in the treatment of mineral and/or including coal which may be fragmentized through progressive treatments within this apparatus. The apparatus lends itself to numerous adjustments in terms of rpm, distances between the tips of the rotor blades and the screen plate and the size and special design of the rotor blades, etc. The blades may also be adjusted in terms of design and configuration, for example, the blade segments in each rotor may be stacked vertically one above another or alternately in any combination of alternating or spiral configuration or given a sweeping half-moon effect if desired which would tend to drag the materials against the slots of the screen plates and thereby scrub, abrade and rub the same into suitable condition for passage therethrough or onto the following phases or zones for treatment. Independent adjustments in the rpm or speed of the rotors will provide significant results as tip speeds operating in conjunction with the cylinder screen are altered with changes in rpm. The combined elements of tip speed, clearance between the screens and the rotor blades, distance and number of rotors, number of rotor or fan blades employed, and in their particular configurations and horsepower applied and the overall diameter of the unit greatly influenced in the presence of special treating conditions, the condition of the feed strongly influences the nature of the ultimate yield of each rotor stage. While a single shaft driving two rotors operating in tandem vertically above one another, with main driving shaft being effected from a single driving source, various changes may be made in achieving the drive of the rotors, either independently or jointly, particularly through variable speed mechanisms such that one rotor is driven at a different speed from the other.

For example, a significant change in treatment in the second rotor zone C may be achieved by a relatively modest increase in the diameter of the second rotor 18 and by its cooperating classifier screen 117. The latter would provide higher tip speeds and thereby increase the intensity of treatment between the rotor blades and the screen in the actual treating zone C of the lower rotor. Thus, the yield of a finer finished product may be achieved. The size and number of holes in the classifier screen 117 may be reduced to give finer separations to provide a more effective grind and to provide products on either side of the same screen of more acceptable quality and size, this being permitted particularly by the novel rotor permitting the flow of air from the rotor to the screen which also assists in clearing of the screen plates from dust, fines and dirt through the pulsating action of such directed air.

As may be appreciated, with respect to the illustrated embodiment of the invention, which is only exemplary, the apparatus and process employed therein permits the recovery of solid waste trash as high energy fuel, with an overall reduction in non-burnables, including glass fragments, occurring at the first stage where the material is subjected to intensive ballistics treatment. It permits this material which then immediately passes through a treating zone where water, solvents, wetting agents, etc. may be added to further control the specific gravity and moisture condition and wherein tough particles of cardboard may be further softened and defibered subsequently at the second rotor stage to enable their passage through the classifier screen at that stage, this permitting at the second rotor stage the production of a product of special fuel grade and comprised of papers, textiles, cellulose and fibers free of oversize plastics, which plastics are pulled out through the aspirator/venturi airstream. Particularly where dry conditions prevail, both pre-treatment prior to feeding at the first stage, and the spray or wetting agent intermediate of the rotor stages act to reduce fire hazards, reduce dust and permit the water-absorbent materials to more quickly reach a flexible condition and to permit them to be relieved more quickly of contaminations, such as glass, dirt, etc.

Further, while the raw material fed to the apparatus of the present invention constitutes municipal solid waste, this is the most difficult, and other raw materials could be identically treated, particularly under a variety of treating conditions available by way of the process and apparatus of the present invention and accommodated by way of the triple discharge. For example, wood chips, flakes and fibers may be evolved from treatments within this machine. Starting with raw wood chips, crushed wood chips, flake chips and reject knots may be treated constructively and properly in the tandem fragmentizer and garbage sorter 5. One concrete example is in the field of multiple-layered fiberboards, hardboards and particle boards. This type of wood fiber building material derived from wood chips usually employ several distinct particle sizes. The tandem fragmentizer and garbage sorter 5, with its triple discharge, advantageously provides three sizes of such semi-finished in-process particles from a single in-feed source. By adjustment of the machine elements and slight modification in their design, the particle sizes may be simultaneously developed for the finished product faces which would be different from those for the inner core of fiberboards, hardboards, particle boards and other molded boards and papers. Where the apparatus and the method of the present invention is employed in the treatment of wood chips for pulp mills prior to introduction to a steam digester, the pretreatment of chips by the instant process is an effective means of decreasing the time cycles required for controlled digester cooking of chips. Further, the segregation of the chips into variable sizes will yield pulps having somewhat different cooking schedules and properties, thereby effecting economies in the wood pulping process. The tandem fragmentizer and classifier is a valuable new development for the preparation of wood chips for subsequent processing industries or to be utilized as fuel. For example, such wood chips so processed may be equally suitable for pelletizing, briquetting and similar molding applications, particularly where the processed wood chips must be sized and classified prior to that manufacture. Because of the particle reduction, the invention has particular application to general classification/benefication areas, and the tandem fragmentizer and sorter may be employed for commercial agricultural processing wherein the sorting permits elimination of seeds, skins, peelings or various fractions of commercial crops. Recovery fractions for fuel also no longer need be wasted but, rather, the invention permits the preparation of a commodity or commodities in the market as in the development of waste fractions from sugarcane bagasse, cornstalks, etc. into a valuable product.

The in-feed to the tandem fragmentizer and sorter may be effectively controlled through the use of any uniform feeding mechanism, particularly if from a head box having an adjustable belt feed rate. Such head box (not shown) would contain a belt feed for the fragmentizer and sorter, with the belt being regulated by rotating rakes mounted above the belt and operating reverse to the flow of feed so as to meter and throw back any excessive feed. It would be advantageous to provide the rakes for adjustment of their axes vertically to create a depth of feed on the belt and across the belt in a uniform manner so that the feeding does not become sluggish or choked.

Further modifications may be made to achieve different rpm for the upper and lower rotors. For instance, the main shaft up to the top of the lower rotor may accommodate a sleeve which rotates independently of the shaft, with the sleeve including suitable bearings and driving sheaves of a suitable diameter to provide a different speed to the lower rotor. Thus, a differential in speed is attainable by adjustment of the pulley diameters between two independently driven shafts. Alternatively, each rotor may be mounted to a separate shaft and driven through a separate, suitable motor and drive belt to provide the different speeds as desired.

The machine and process as application to asbestos treatment where the asbestos to be fragmentized for purposes of separation of the mineral fibers permits the machine to constitute an ideal vehicle for this application. In addition, gypsum products, clay coatings, sulfur products and other minerals, as well as many other organics and inorganics may be readily processed under the same triple classification techniques provided by the apparatus of this invention.

A plurality of vertical breaker bars may be mounted to the inside surface of the classifier screen 115 at the first rotor stage. Alternatively, the bars can be spirally disposed, the bars being highly desirable in most cases to obtain a finer grind on certain material. The breaker bars are useful in chopping tough cardboard, wood chips or coarse minerals and ores. In addition, the bars insuring a finer grind are useful for many wood stems and fibrous materials for reduction of particle size prior to classification at the second stage rotor. The number of bars and their configuration, as well as the thickness of the blades 20 and 21, may be varied to meet demand. For example, the blades may be employed in greater or smaller numbers and with special tips which range from a large head, such as a 4 inch hammerhead for breaking ore, to a thin blade of 1/16 inch for cutting light fibrous materials or vegetable fibers. The feed blades as at 22 are normally of heavier stock and of shorter length to permit quick entry of the feed into a spiral rotating mode and to thereby fall into the rotor rapidly for movement therethrough and effective discharge. The sprays as at 16 and 17 are illustrated as spraying liquid, but air or powder may be sprayed, and any combination of chemicals for treatment of materials processed within the fragmentizer and classifier may be sprayed onto the moving material. An example resides in water with ethylene glycol to provide rapid wetting, de-icing and to condition the material for softening and for reduction in material size. However, wetting agents in general, solvents, electro-molecular and ionic constituents may be added and blended with the moving chopped material for brittling, crushing, shredding, pulverizing and improved results in size classification, weight classification and surface or internal treatment of the materials processed within the fragmentizer and sorter, including additives for improved fuel characteristics.

The automatic sorting and direct extraction of a cleaned paper product from trash, refuse and city garbage, having no prior commercial value except as land fill or refuse derived fuel as described heretofore, constitutes a dramatic embodiment of my invention as an improved garbage sorting machine.

While the U.S. paper trades have established numerous grades, as well as the means for collecting a variety of commercial papers, such as in recycled or used papers and secondary fibers which seek specific reuse aplications, these grades are well known to the related secondary fiber trades and used paper industries. Such secondary fibers or used papers are normally collected by paper stock dealers frm sources which include converters and publishers' trim, over-runs, tab cards, corrugated boxes and the like. However, none of the used paper sources deal in garbage, yard trash and refuse, including municipal solid waste, the illustrative subject of this disclosure, and related claims specific to this invention. Also, the claims hereon do not refer to any recognized commercial grades of cellulose, used papers and secondary fibers or related contaminated mixtures thereof, including a waste paper grade known to the trade as "mixed waste papers." The latter categories constitute known requirements in their processing and preparation, having no reference to the obstacles, treating and preparation cited herein as specifically derived from paper as a percentage of city garbage, trash, municipal solid waste and the like. This is not to say that my garbage sorter would not be useful for certain treatments for used paper and secondary fiber classifications. Indeed, certain modifications of my technology as described herein have proven to be advantageous for certain processes, treatments and applications sought by large paper mills and others engaged in the upgrading of secondary fibers, such as old corrugated boxes and the like. However, such processes and applicable techniques are described in detail elsewhere for separate patent and related purposes.

An important feature of the subject garbage sorter described herein as the key machine for fuel recovery is to alternatively and optionally provide for an effective means to deliver a clean paper product having no prior commercial use or value but thoroughly suitable for direct use by paper mills, being derived as one portion of trash, refuse and city garbage. This application of my pilot machinery and technology has been thoroughly demonstrated through full and extensive use of an municipal solid waste garbage resource operations of recovery plants followed by a paper machine inside a U.S. paper mill, whereby a grade of commercial folding box board was forthwith successfully produced using my singular municipal solid waste refuse recovered paper product. In the latter instance, 100% of the structural filler fiber, constituting about 90%, by weight, was used for this commercial container paper and packaging commodity, thereby exemplifying a successful example of the ability of my sorting machine to isolate one of the valuable fractions of refuse and trash for recovery as opposed to burning and dumping.

The pre-treatment requirements for producing the paper product described above were considerably more stringent than the requirements for fuel or any other feed stock. Semi-dry, no other garbage sorting machine has been known to produce these results. The yield was approximately 22-33%, by weight, of the original garbage (municipal solid waste) as received at the tipping floor of the E. Bridgewater Solid Waste Resources Recovery Facility in the vicinity of Brockton, Mass., where paper constitutes about 45% of total municipal solid waste.

Pre-sizing and pre-treatments of the garbage was required to produce my paper recovery product. For example, garbage (municipal solid waste) stored in a pile of 6-30 foot in height tends to quickly heat, dewater and dry out. Paper portions become friable and heavily contaminated with combined plastics, organics, glass and dirt. It is well to note that this condition does not, however, apply to various grades of used papers or secondary fibers or any known contaminated mixtures of cellulose. For example, the bulk of garbage, trash and refuse requires intensive treatments of crushing and shredding to reduce the mass of refuse to a controllable condition and to minimize the destructive effects of metals, stones, wood, tree limbs, bark, rubber, rugs, textiles, carpeting and plastics, including bottles, foam, hose and ropes, while still retaining the available paper fraction in a condition for recovery purposes. The available paper fraction in garbage ranges from approximately 35-45%, by weight. Because of uncontrolled variables, the paper in the trash is not fully recoverable and no claims are made accordingly. Thus, concepts and practices differ greatly from any other practices for recovery of papers. Contaminated mixtures of cellulose or any other used paper, recycled or secondary fiber source as established by paper trades have no direct relationship.

In the preliminary preparation of garbage for paper recovery, it is essential to remove most heavy objects, such as metals, stones, wood, carpeting, etc. The residual mixture is rich in garbage, organics, glass, plastics, paper and contaminations of all descriptions. By adding controlled moisture as needed to maintain approximately 20-30% moisture content, the paper products rapidly and selectively absorb larger quantities of moisture than plastics, for example. But even larger quantities of moisture are accepted in loose dirt, small organics and the like which soak up copious quantities of added water. In summary, the heavily loaded and moisturized portions fractionate quickly, and 10-20% of the volume is lost at the first classifier screen. First-stage moisture loss in the remaining paper is made up at the intermediate stage. Oversize items are rejected at the second selectifer screen, and the remaining paper product is shredded through the second and lower selectifer screen plate. Control of the paper at the second stage is regulated by the combined air influencing plastic rejections, etc. Rejects may be easily recycled or converted to fuel. Thus, the direct recovery of paper fiber from city garbage is hereby disclosed in brief.

Nothing herein shall be construed to limit any disclosure or prohibit the wide adjustments and tuning of the machinery and the processes described. For example, a range of product sizes, paper weights, quality, and control of the paper quantity recovered can be effected through extensive combinations and variations possible through my process and as shown by the accompanying drawings.

It is inherent that the paper fraction resulting from my municipal solid waste process exhibits consistently high physical properties. Degraded portions of the feed stock do not survive the rigorous processing. Therefore, residual fractions of the accepted stock attains are exceptionally high fiber quality. Pulps confirm ranges of 300–500 Canadian Standard Freeness (CSF) suitable for use as high quality cellulose pulp for paper and allied products, a uniform and marketable raw material when baled, air dry, for domestic and export shipments.

While the invention has been particularly shown and described with reference to a preferred embodiment thereof, it will be understood by those skilled in the art that various changes in form and details may be made therein without departing from the spirit and scope of the invention.

What is claimed is:

1. In an apparatus for obtaining a substantially plastic-free product from a chopped mixture derived from municipal solid waste, said apparatus comprising:
   a tubular, vertical wall defining a hollow vertically-oriented rotor chamber;
   a shaft extending vertically within said chamber and mounted for rotation about its axis;
   means for rotating said shaft;
   rotor blades fixedly mounted to said shaft and extending radially thereto for chopping said mixture and imparting centrifugal force to the mixture particles;
   at least one open bottom classifier screen concentrically surrounding the rotor blades and positioned within said rotor chamber between said rotor blades and said wall to form an annular collection chamber radially outward of said screen, and being spaced slightly from the tips of the blades to permit radial passage of particles of said mixture through said classifier screen corresponding to screen mesh size;
   means defining an inlet at the top of the rotor chamber for said chopped mixture;
   means defining a first outlet at the bottom of said chamber centered axially within said screen; and
   means defining at least one outlet from said collection chamber,
   the improvement comprising means for directing a high-velocity horizontal airflow across the open lower end of the screen from one side of said chamber to the other to cause lightweight particles of said mixture, including plastic film, to be aspirated into the first outlet from the interior of the screen and to thereby prevent clogging or blinding of said screen within said rotor chamber.

2. The apparatus as claimed in claim 1 further comprising duct means extending beneath the bottom of said chamber for confining said horizontal airflow and forming at least one venturi to accelerate airflow below the rotor chain and induce the vacuum in the area of the rotor blade tips and the screen to facilitate removal of lightweight particles from the rotor chamber.

3. The apparatus as claimed in claim 1 wherein said rotor chamber includes upper and lower vertically-displaced rotors, separate cylindrical classifier screens are provided for respective rotors, said apparatus further comprises baffle means for vertically separating the annular collector chamber formed between said classifier screen and the wall of the rotor chamber into two sections, and said means for defining at least one outlet comprises means for defining second and third outlets for independently discharging particles of said chopped mixture passing through respective screens and within respective collection chamber sections, whereby said rotors and said screens define first and second mixture ballistic classifier zones.

4. The apparatus as claimed in claim 2 wherein said rotor chamber includes upper and lower vertically-displaced rotors, separate cylindrical classifier screens are provided for respective rotors, said apparatus further comprises baffles means for vertically separating the annular collector chamber formed between said classifier screen and the wall of the rotor chamber into two sections, and said means for defining at least one outlet comprises means for defining second and third outlets for independently discharging particles of said chopped mixture passing through respective screens and within respective collection chamber sections, whereby said rotors and said screens define first and second mixture ballistic classifier zones.

5. The apparatus as claimed in claim 3 wherein said screens are of different mesh size.

6. The apparatus as claimed in claim 4 wherein said screens are of different mesh size.

7. The apparatus as claimed in claim 3 wherein said upper and lower rotors are vertically spaced within said rotor chamber to define a liquid treatment zone intermediate of said first and second ballistic classifier zones, and said liquid treatment zone further comprising fluid spray means for spraying fluids on the mixture particles during movement downwardly from the first ballistic classifier zone to the second ballistic zone, whereby the specific gravity of the particles passing from the first ballistic classifier zone to the second ballistic classifier zone may be increased to the extent of their liquid absorption rate capability to further facilitate attrition of said particles and ballistic classification of the chopped mixture particles within said second ballistic classifier zone.

8. The apparatus as claimed in claim 4 wherein said upper and lower rotors are vertically spaced within said rotor chamber to define a liquid treatment zone intermediate of said first and second ballistic classifier zones, and said liquid treatment zone further comprising fluid spray means for spraying fluids on the mixture particles during movement downwardly from the first ballistic zone to the second ballistic classifier zone, whereby the specific gravity of the particles passing from the first ballistic classifier zone to the second ballistic classifier zone may be increased to the extent of their liquid absorption rate capability to further facilitate attrition of said particles and ballistic classification of the chopped mixture particles within said second ballistic classifier zone.

9. The apparatus as claimed in claim 1 wherein said means for mounting said rotor blades to said shaft comprises a hollow tubular hub fixed to said shaft and concentrically mounted to said shaft, and said rotor blades fixed to the outer periphery of said tubular hub and extend radially outwardly therefrom, and wherein said hub is open axially to draw air into the hollow hub during rotation of said shaft, and said hub includes a plurality of circumferentially-spaced slots within its periphery, whereby air drawn into the interior of the hollow hub during rotation of the shaft radially parallel to the blades and between the blades for a pulse application to the screen to assist in prevention of classification screen clogging by mixture particles and to facilitate material particle classification thereof.

10. The apparatus as claimed in claim 2 wherein said means for mounting said rotor blades to said shaft comprises a hollow cylindrical hub fixed to said shaft and concentrically mounted to said shaft, and said rotor blades fixed to the outer periphery of said cylindrical hub and extend radially outwardly therefrom, and wherein said hub is open axially to draw air into the hollow hub during rotation of said shaft, and said hub includes a plurality of circumferentially-spaced slots within its outer periphery, whereby air drawn into the interior of the hollow hub during rotation of the shaft radially parallel to the blades and between the blades for a pulse application to the screen to assist in prevention of classification screen clogging by mixture particles and to facilitate material particle classification thereof.

11. The apparatus as claimed in claim 9 wherein said outlet means within said vertical wall for independently discharging particles of chopped mixture passing through respective screens and within respective collection chamber sections comprises duct means extending outwardly from one side of said wall at respective levels of said upper and lower rotors, and said apparatus further comprises opposite said ducts, air inlet means within said wall opposite said outlet ducts, said air inlet means and said outlet ducts further comprising cyclone separators for insuring movement of classified material particles to said outlet ducts under operation of said rotor and induced airflow through said hollow hubs axially from at least the open upper end from said inlet at the top of said rotor chamber and transversely from said air inlets within said vertical wall.

12. The apparatus as claimed in claim 11 wherein said air inlet means comprises a plurality of slots within said enclosed vertical wall at the levels of said upper and lower rotors, and a cover mounted to said wall and overlying said slots and being mounted for limited shifting movement with respect to said enclosed vertical wall, said cover carrying corresponding slots such that by shifting said cover with respect to said wall, said slots within said cover may be aligned with those of said wall or misaligned with respect thereto to vary the amount of air passing through said air inlets within said vertical wall.

13. A process for obtaining a substantially plastic-free, low ash content chopped paper product from a ferrous metal and heavy object-free chopped municipal solid waste light fraction, said process comprising the steps of:
causing the chopped light fraction municipal solid waste to a gravity flow within a vertical enclosure;
spinning the chopped light fraction municipal solid waste at a first level within a controlled horizontal airstream to impart centrifugal force to the light fraction particles and to cause the grit, glass and metal reject particles to pass radially outwardly through a first classifier screen at said first level;
spinning the remaining light fraction municipal solid waste particles at a second lower level within a controlled horizontal airstream to impart centrifugal force to the remaining light fraction particles and to cause substantially plastic-free chopped paper accept particles to pass radially outwardly through a second classifier screen; and
subjecting the particles as they vertically descend within said vertical enclosure to a high-velocity horizontal airflow across the lower end of said vertical enclosure below the second spinning level to remove light plastic particles from at least the second spinning level and to thereby insure the absence of plastics from said accept particles emanating from said second spin level.

14. The apparatus as claimed in claim 1 wherein said rotor blades comprise flat strips, and wherein said strips include elongated slots extending along the upper and lower surfaces thereof radially inwardly from the tip ends thereof, and wherein the leading edge of said blades at least adjacent the tip ends in the direction of rotation are beveled downwardly so as to induce centrifugal and downward movement of the material as the blades rotate about the shaft axis.

15. The apparatus as claimed in claim 9 further comprising vertical fan blades fixed to said shaft and extending radially outwardly thereof, said blades extending towards said hollow tubular hub but terminating some distance therefrom such that rotation of said shaft causes said fan blades to induce air movement axially into said hub and pulse air flow radially through said hub circumferentially spaced slots to facilitate particulate material and air movement radially away from the rotor zone.

16. A rotor assembly for chopping solid particles and imparting centrifugal force to the particles, said rotor assembly being supported by a shaft driven in rotation about its axis, sais rotor assembly comprising:
a hollow tubular hub concentrically fixed to said shaft;
a plurality of rotor blades fixed to the outer periphery of said tubular hub and extending radially outwardly therefrom;
said hub being open axially on at least one end;
a plurality of circumferentially spaced slots within the hub periphery; and
a plurality of fan blades internal of said hub and rotatable therewith to cause air and particulate material to be drawn into the interior of the hollow hub for discharge through the hub slots at right angles to the shaft axis to facilitate air and particulate material movement radially away from the rotor zone.

17. Apparatus for obtaining from municipal solid waste a paper product substantially free of plastic, said waste having been treated for the removal of metals and heavy objects, said apparatus comprising:
first and second stage screening units;
said first stage unit having a screen and means for chopping and pulverizing and forcing through said screen as a first fraction solid materials other than paper while chopping and shredding the paper to a size generally larger than will pass said screen as the major component of a second fraction containing also plastic that will not pass said first stage screen;
said second stage unit having a screen with openings larger than those of said first stage screen and means for chopping and shredding said paper component of said second fraction to reduced size generally small enough to pass said second stage screen and to force said reduced size paper together with air through said second stage screen;

said second stage unit also having a housing provided with an inlet for said first fraction of said first stage screen, an accepts outlet for the material passing said second stage screen and a rejects outlet for material not passing said second stage screen, and means for causing a continual airflow in the vicinity of the face of said second stage screen exposed to the paper as it is chopped and shredded to entrain and carry to and out said reject outlet light plastic pieces; and means for transferring said second fraction from the outlet of said first stage unit to the inlet of said second stage unit.

18. Apparatus according to claim 17 which includes means for adding liquid to said second fraction.

19. Apparatus according to claims 17 or 18 wherein said second stage screen openings are of at least approximately $\frac{5}{8}$ths inch mesh.

20. Apparatus according to claim 19 wherein said second stage screen openings are of approximately $\frac{5}{8}$ to $\frac{3}{4}$ inch mesh.

21. Apparatus according to claim 18 wherein said second stage screen is generally cylindrical with its axis vertically disposed, said second stage means for chopping and shredding is a bladed rotor having means for rotating the same about the axis of the second stage screen, and said inlet is in the upper part and said reject outlet is in the lower part of said second stage housing.

* * * * *